L. BRUCKMANN.
METHOD OF MAKING CHAIN.
APPLICATION FILED NOV. 8, 1909.
975,928.
Patented Nov. 15, 1910.
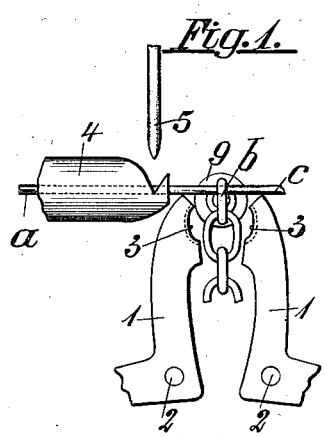
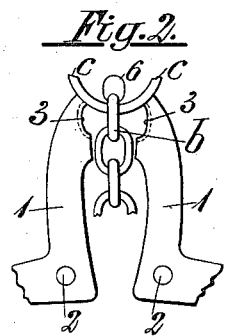
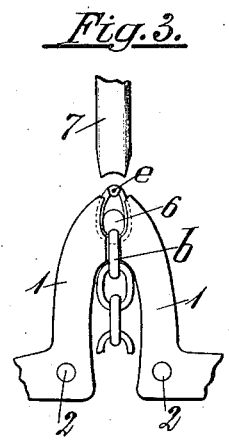
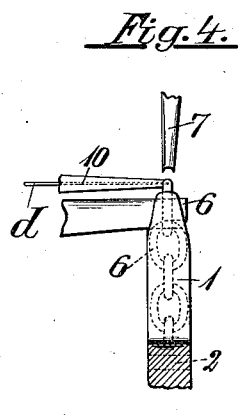
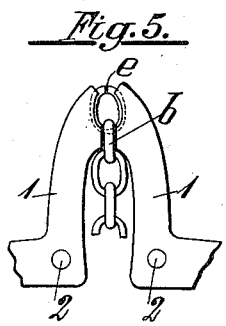
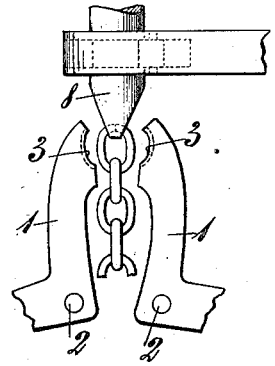
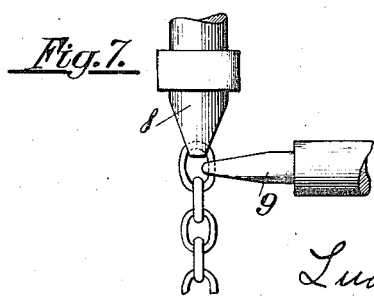
Witnesses
Parker Cook
Inventor
Ludwig Bruckmann
by
Attorney

UNITED STATES PATENT OFFICE.

LUDWIG BRUCKMANN, OF PFORZHEIM, GERMANY.

METHOD OF MAKING CHAIN.

975,928.

Specification of Letters Patent. Patented Nov. 15, 1910.

Application filed November 8, 1909. Serial No. 526,833.

*To all whom it may concern:*

Be it known that I, LUDWIG BRUCKMANN, a citizen of the German Empire, residing at Pforzheim, in the Grand Dukedom of Baden, Empire of Germany, have invented certain new and useful Improvements in Methods of Making Chain; and I do hereby declare the following to be a full, clear, and exact description of the invention, such as will enable others skilled in the art to which it appertains to make and use the same.

Cable pattern chains with caught soldered links have hitherto been made of hollow wire with a core of solder, but, in consequence of the high cost of manufacturing such wire, this method is only adapted for thin and light chains. In some cases they have been made of solid wire, in which case, however, two separate machines have had to be employed, one machine forming the chain, the other soldering the links. By the improved method it is possible to make finished chains of solid wire in a single operation, which is an advantage, more particularly in the case of comparatively thick and heavy chains. The method of shaping the chain links is already known.

By the term "caught soldered links" I refer to a chain made up of sections each formed by soldering two elementary links together, and, if one of such links be turned through 180° before soldering the two together, it will be obvious that the ends of the elemental links may be all brought together so that a single mass of solder will secure the ends of both the links together and also the links themselves together into integral sections each made up of two elementary links.

Now the essential feature of the invention consists in the introduction of solder into the joint of the chain link, *i. e.* between the ends of the wire composing the link and before the link is quite closed, so that when the chain link is entirely closed, the solder is clamped in place, so that the only operation required to finish the chain is to treat it in the ordinary way with soldering fluid and then heat it. In this way cable pattern chains with caught suspended links are automatically made, the links consisting of solid wire.

The improved method will now be more particularly described in connection with an apparatus shown as an example in the accompanying drawings, in which:—

Figures 1–3 show the progressive formation of a link; Fig. 4 the insertion of the solder; and Figs. 5–7 illustrate the further operations.

The chain links *b* are made in the ordinary way of wire *a*, which according to this invention may be solid. For making the links *b*, shaping jaws 1 are provided which are turned on pivots 2 by means of suitable operating mechanism and have recesses 3 corresponding to the shape of the chain links. The wire *a* to be treated is then conveyed through a sleeve or holder 4 and pushed forward periodically. The sleeve or holder is so arranged that the wire *a* passes through the last link *b* of the finished chain which is held ready, for instance, by means of a pliers 9 (Figs. 1 and 7). The piece necessary for making a link is then cut off mechanically from the wire *a* by means of a knife 5, whereupon a mandrel 6 presses the piece cut off down into the recesses 3 of the jaws 1, which then close (Figs. 2 and 3). The blade of the knife 5 is so formed that, after the closing of the link, the cut edges *c* of the wire rest as closely together as possible over the entire surface. Before, however, these surfaces *c* are brought into contact, solder *e* is introduced between them. For this object a solder wire *d* is employed which is periodically pushed forward by mechanical means and which is guided in a holder 10, in such a way that the solder wire comes directly between the ends *c* of the shaped wire. The final closing of the links *b* is then effected by a die 7 which presses from above on the ends *c* and presses these on the mandrel 6. This die 7, according to this invention, is formed on the solder side as a knife, so that a piece of solder *e* corresponding to the thickness of the wire is cut off (Figs. 4 and 5). On the further descent of the die 7, it completely closes the chain link and the solder *e* is thereby jammed or clamped, whereupon the mandrel 6 is withdrawn. The finished chain is then turned through 90° by means of the pliers 8 and lifted until the wire *a* can enter the aperture of the last formed chain link. The latter is now gripped by the pliers 9, which turn in the ordinary way each second link through 180°, so that the joints of each two links encounter one another, as is necessary in caught hanging chain links. Finally, the chain provided with solder in the manner hereinbefore set forth is treated as usual with soldering fluid and heated, so that it is thereby made quite automatically.

I declare that what I claim is:—

1. The method of making a link for a chain which consists in bending a suitable blank from which the link is to be formed so as to cause the ends thereof to approach one another, placing a piece of solder between the ends of said blank, and completing the bending of said blank so as to cause the ends thereof to engage and grasp the piece of solder aforesaid between them and hold the same in proper position.

2. The method of making chain which consists in bending a suitable blank from which a link is to be formed so as to cause the ends thereof to approach one another, placing a piece of solder between the ends of said blank, completing the bending of said blank so as to cause the ends to engage and grasp the piece of solder aforesaid between them and hold the same in proper position, inserting a second blank through the link formed as aforesaid, bending said second blank so as to cause the ends thereof to approach one another, placing a piece of solder between the ends of said second blank, completing the bending of said second blank, so as to cause the ends thereof to engage and grasp the piece of solder aforesaid between them and hold the same in position, and turning said second link through 180° so as to bring the four free ends of said two links and the two pieces of solder held by them together.

In testimony whereof I affix my signature, in presence of two witnesses.

LUDWIG BRUCKMANN.

Witnesses:
  JEAN GULDEN,
  HERMANN HOPPE.